United States Patent
Cho et al.

(10) Patent No.: US 10,305,081 B2
(45) Date of Patent: May 28, 2019

(54) SEPARATOR FOR RECHARGEABLE BATTERY AND RECHARGEABLE BATTERY INCLUDING THE SAME

(71) Applicants: SAMSUNG SDI CO., LTD., Yongin-si, Gyeonggi-do (KR); SAMSUNG ELECTRONICS CO., LTD., Suwon-si, Gyeonggi-do (KR)

(72) Inventors: Minho Cho, Suwon-si (KR); Seungrim Yang, Seongnam-si (KR); Hyoungwoo Choi, Hwaseong-si (KR); Hana Kim, Suwon-si (KR); Jun Hyuk Moon, Daejeon (KR); Myungkook Park, Suwon-si (KR); Byungmin Lee, Suwon-si (KR); Jungsue Jang, Suwon-si (KR); Sung Soo Han, Hwaseong-si (KR)

(73) Assignees: Samsung SDI Co., Ltd., Yongin-si, Gyeonggi-do (KR); Samsung Electronics Co., Ltd., Suwon-si, Gyeonggi-do (KR)

( * ) Notice: Subject to any disclaimer, the term of this patent is extended or adjusted under 35 U.S.C. 154(b) by 31 days.

(21) Appl. No.: 15/341,256

(22) Filed: Nov. 2, 2016

(65) Prior Publication Data
US 2017/0133654 A1    May 11, 2017

(30) Foreign Application Priority Data
Nov. 6, 2015  (KR) .................. 10-2015-0156099

(51) Int. Cl.
*H01M 2/16* (2006.01)
*C08L 79/04* (2006.01)
(Continued)

(52) U.S. Cl.
CPC ........ *H01M 2/1686* (2013.01); *C08G 73/101* (2013.01); *C08G 73/1014* (2013.01); *C08G 73/1035* (2013.01); *C08G 73/1039* (2013.01); *C08G 73/1042* (2013.01); *C08G 73/1067* (2013.01); *C08G 73/1078* (2013.01); *C08G 73/14* (2013.01); *C09D 163/00* (2013.01);
(Continued)

(58) Field of Classification Search
CPC ...... H01M 2/16; H01M 2/166; H01M 2/1686; C08L 79/04; C08G 73/06; C08G 73/0672
See application file for complete search history.

(56) References Cited

U.S. PATENT DOCUMENTS

| | | | |
|---|---|---|---|
| 2006/0019154 A1* | 1/2006 | Imachi | H01M 2/1653 429/144 |
| 2010/0221965 A1* | 9/2010 | Katayama | H01G 9/02 442/59 |
| 2014/0272532 A1* | 9/2014 | Park | H01M 2/166 429/144 |

FOREIGN PATENT DOCUMENTS

| | | |
|---|---|---|
| JP | 2005-209570 A | 8/2005 |
| JP | WO2005/080487 A1 | 9/2005 |

(Continued)

*Primary Examiner* — Karie O'Neill Apicella
*(74) Attorney, Agent, or Firm* — Lee & Morse, P.C.

(57) ABSTRACT

A separator for a rechargeable battery includes a porous substrate and a heat-resistance layer disposed on at least one surface of the porous substrate, wherein the heat-resistance layer includes a cross-linkable binder, and the cross-linkable binder is derived from a polymer including a structural unit including an aromatic moiety and a (meth)acrylate group; and a rechargeable lithium battery includes the same.

17 Claims, 1 Drawing Sheet

(51) Int. Cl.
*C08G 73/06* (2006.01)
*C09D 163/00* (2006.01)
*C09D 179/08* (2006.01)
*C08G 73/10* (2006.01)
*C08G 73/14* (2006.01)
*H01M 10/0525* (2010.01)
*C08K 3/22* (2006.01)

(52) U.S. Cl.
CPC .......... *C09D 179/08* (2013.01); *H01M 2/166* (2013.01); *C08K 2003/2227* (2013.01); *H01M 10/0525* (2013.01)

(56) References Cited

FOREIGN PATENT DOCUMENTS

| | | |
|---|---|---|
| JP | 2007-197663 A | 8/2007 |
| JP | 2010-092718 A | 4/2010 |
| JP | 4588136 B2 | 11/2010 |
| JP | 2012-128979 A | 7/2012 |
| JP | 2013-069582 A | 4/2013 |
| JP | 2014-240189 A | 12/2014 |
| KR | 1999-0083447 A | 11/1999 |
| KR | 10-2006-0053913 A | 5/2006 |
| KR | 10-0721688 B1 | 5/2007 |
| KR | 10-2009-0056811 A | 6/2009 |
| KR | 10-2009-0088646 A | 8/2009 |
| KR | 10-1002161 B1 | 12/2010 |
| KR | 10-1161226 B1 | 7/2012 |
| KR | 10-1208698 B1 | 12/2012 |
| KR | 10-2013-0070229 A | 6/2013 |
| KR | 10-1344939 B1 | 12/2013 |
| KR | 10-2014-0070199 A | 6/2014 |
| KR | 10-2014-0147416 A | 12/2014 |
| KR | 10-2014-0147742 A | 12/2014 |
| WO | WO 2005/080487 A1 | 9/2005 |

* cited by examiner

SEPARATOR FOR RECHARGEABLE BATTERY AND RECHARGEABLE BATTERY INCLUDING THE SAME

CROSS-REFERENCE TO RELATED APPLICATION

Korean Patent Application No. 10-2015-0156099, filed on Nov. 6, 2015, in the Korean Intellectual Property Office, and entitled: "Separator for Rechargeable Battery and Rechargeable Battery Including the Same," is incorporated by reference herein in its entirety.

BACKGROUND

1. Field

Embodiments relate to a separator for a rechargeable battery and a rechargeable lithium battery including the same.

2. Description of the Related Art

A separator for an electrochemical battery is an intermediate film that separates a positive electrode and a negative electrode in a battery, and maintains ion conductivity continuously to enable charge and discharge of a battery.

SUMMARY

Embodiments are directed to a separator for a rechargeable battery includes a porous substrate and a heat-resistance layer disposed on at least one surface of the porous substrate, wherein the heat-resistance layer includes a cross-linkable binder, and the cross-linkable binder is derived from a polymer including a structural unit including an aromatic moiety and a (meth)acrylate group.

The structural unit including the aromatic moiety may include a structural unit including aromatic imide or a derivative thereof, a structural unit including aromatic amide or a derivative thereof, a structural unit including novolac or a derivative thereof, a structural unit including bisphenol or a derivative thereof, or a combination thereof.

The structural unit including the aromatic moiety may be represented by Chemical Formula 1 or 2.

[Chemical Formula 1]

[Chemical Formula 2]

In Chemical Formula 1 and 2, $L^1$ to $L^5$ may independently be a single bond, a substituted or unsubstituted C1 to C30 divalent aliphatic group, a substituted or unsubstituted C3 to C30 divalent aliphatic cyclic group, a substituted or unsubstituted C6 to C30 divalent aromatic group, a substituted or unsubstituted C3 to C30 divalent heterocyclic group, a substituted or unsubstituted C3 to C30 divalent heteroaromatic group, O, CO, COO, $SO_2$, or $CONR^a$, or a combination thereof,

$R^1$ to $R^4$ and $R^a$ may independently be hydrogen, a substituted or unsubstituted C1 to C20 alkyl group, a substituted or unsubstituted C2 to C20 alkenyl group, a substituted or unsubstituted C1 to C20 alkoxy group, a substituted or unsubstituted C3 to C20 cycloalkyl group, a substituted or unsubstituted C3 to C20 cycloalkenyl group, a substituted or unsubstituted C6 to C20 aromatic group, a substituted or unsubstituted C3 to C20 heteroaromatic group, a substituted or unsubstituted silyl group, a hydroxy group, a halogen, a nitro group, or a combination thereof, A may be a substituted or unsubstituted C6 to C30 aromatic group or a C3 to C30 aliphatic cyclic group.

At least one of $L^1$ to $L^3$ of Chemical Formula 1 or at least one of $L^4$ and $L^5$ of Chemical Formula 2 may include a substituted or unsubstituted divalent aromatic group or a substituted or unsubstituted C3 to C30 divalent heteroaromatic group.

The structural unit including the aromatic moiety may include a moiety represented by Chemical Formula 1 or 2 and a moiety represented by Chemical Formula 3A or 3B,

[Chemical Formula 1]

[Chemical Formula 2]

In Chemical Formula 1 and 2, $L^1$ to $L^5$ may independently be a single bond, a substituted or unsubstituted C1 to C30 divalent aliphatic group, a substituted or unsubstituted C3 to C30 divalent aliphatic cyclic group, a substituted or unsubstituted C6 to C30 divalent aromatic group, a substituted or unsubstituted C3 to C30 divalent heterocyclic group, a substituted or unsubstituted C3 to C30 divalent heteroaromatic group, 0, CO, COO, $SO_2$, or $CONR^a$, or a combination thereof, $R^1$ to $R^4$ and $R^a$ may independently be hydrogen, a substituted or unsubstituted C1 to C20 alkyl group, a substituted or unsubstituted C2 to C20 alkenyl group, a substituted or unsubstituted C1 to C20 alkoxy group, a substituted or unsubstituted C3 to C20 cycloalkyl group, a substituted or unsubstituted C3 to C20 cycloalkenyl group, a substituted or unsubstituted C6 to C20 aromatic group, a substituted or unsubstituted C3 to C20 heteroaromatic group, a substituted or unsubstituted silyl group, a hydroxy group, a halogen, a nitro group, or a combination thereof, and A may be a substituted or unsubstituted C6 to C30 aromatic group or a C3 to C30 aliphatic cyclic group,

[Chemical Formula 3A]

[Chemical Formula 3B]

wherein, in Chemical Formula 3A and 3B, $L^6$ and $L^7$ may independently be a single bond, a substituted or unsubstituted C1 to C30 divalent aliphatic group, a substituted or unsubstituted C3 to C30 divalent aliphatic cyclic group, a substituted or unsubstituted C6 to C30 divalent aromatic group, a substituted or unsubstituted C3 to C30 divalent heterocyclic group, a substituted or unsubstituted C3 to C30 divalent heteroaromatic group, O, CO, COO, $SO_2$, or $CONR^b$, or a combination thereof, and $R^5$ to $R^7$ and $R^b$ may independently be hydrogen, a substituted or unsubstituted C1 to C20 alkyl group, a substituted or unsubstituted C2 to C20 alkenyl group, a substituted or unsubstituted C1 to C20 alkoxy group, a substituted or unsubstituted C3 to C20 cycloalkyl group, a substituted or unsubstituted C3 to C20 cycloalkenyl group, a substituted or unsubstituted C6 to C20 aromatic group, a substituted or unsubstituted C3 to C20 heteroaromatic group, a substituted or unsubstituted silyl group, a hydroxy group, a halogen, a nitro group, or a combination thereof.

At least one of $L^1$ to $L^3$ of Chemical Formula 1 or at least one of $L^4$ and $L^5$ of Chemical Formula 2 may include a substituted or unsubstituted divalent aromatic group or a substituted or unsubstituted C3 to C30 divalent heteroaromatic group, and at least one of $L^6$ and $L^7$ of Chemical Formula 3A and 3B may include a substituted or unsubstituted C6 to C30 divalent aromatic group or a substituted or unsubstituted C3 to C30 divalent heteroaromatic group.

The structural unit including the aromatic moiety may include a novolac epoxy moiety.

The structural unit including the aromatic moiety may include a moiety of bisphenol A or a derivative thereof, bisphenol B or a derivative thereof, bisphenol F or a derivative thereof, bisphenol S or a derivative thereof, or a combination thereof.

The polymer may have at least two (meth)acrylate groups.

The heat-resistance layer may further include polyvinylidene fluoride (PVdF), a polyvinylidene fluoride-hexafluoropropylene (PVdF-HFP) copolymer, polymethylmethacrylate, polyacrylonitrile, polyvinylpyrrolidone, polyvinylacetate, a polyethylene-vinylacetate copolymer, polyethyleneoxide, cellulose acetate, cellulose acetate butyrate, cellulose acetate propionate, cyanoethylpullulan, cyanoethylpolyvinyl alcohol, cyanoethyl cellulose, cyanoethylsucrose, pullulan, carboxylmethyl cellulose, an acrylonitrile-styrene-butadiene copolymer, or a combination thereof.

The heat-resistance layer may further include an inorganic filler, an organic filler, an organic/inorganic filler, or a combination thereof.

The inorganic filler may include a metal oxide, a semimetal oxide, a metal fluoride, a metal hydroxide, or a combination thereof, and the organic filler may include an acrylic compound, an imide compound, an amide compound, or a combination thereof.

The inorganic filler may include $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, or a combination thereof.

The porous substrate may include a polyolefin.

The porous substrate may include a single layer or two or more layers.

The separator may exhibit a thickness variation ratio of less than or equal to about 30% after being allowed to stand at 200° C. for 10 minutes.

Embodiments are also directed to a rechargeable lithium battery that includes a positive electrode, a negative electrode, and the separator according to an embodiment between the positive electrode and the negative electrode.

BRIEF DESCRIPTION OF THE DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art.

In the drawing figures, the dimensions of layers and regions may be exaggerated for clarity of illustration. Like reference numerals refer to like elements throughout.

As used herein, when a definition is not otherwise provided, the term 'substituted' refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C20 alkoxy group, a C1 to C20 heteroalkyl group, a C3 to C20 heteroarylalkyl group, a C3 to C20 cycloalkyl group, a C3 to C20 cycloalkenyl group, a C4 to C20 cycloalkynyl group, a C2 to C20 heterocycloalkyl group, and a combination thereof.

As used herein, when a definition is not otherwise provided, "hetero" refers to one including 1 to 3 hetero atoms selected from N, O, S, and P, and remaining carbons in one compound or substituent.

Hereinafter, a separator for a rechargeable battery according to an embodiment is described.

Figure 1:
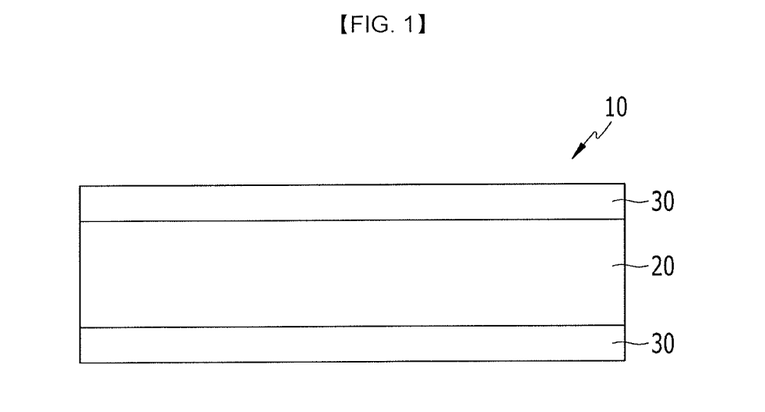
FIG. 1 illustrates a view showing a separator for a rechargeable battery according to an embodiment.

FIG. 1 is a view of a separator for a rechargeable battery according to an embodiment.

Referring to FIG. 1, a separator 10 for a rechargeable battery according to an embodiment includes a porous substrate 20 and a heat-resistance layer 30 disposed on one surface or both surfaces of the porous substrate 20.

The porous substrate 20 may have a plurality of pores and may generally be a porous substrate used in an electrochemical device. Non-limiting examples of the porous substrate 20 may be a polymer film formed of a polymer or a mixture of two or more of polyolefin such as polyethylene and polypropylene, polyester such as polyethyleneterephthalate and polybutyleneterephthalate, polyacetal, polyamide, polyimide, polycarbonate, polyetheretherketone, polyaryletherketone, polyetherimide, polyamideimide, polybenzimidazole, polyethersulfone, polyphenyleneoxide, a cyclic olefin copolymer, polyphenylenesulfide, polyethylenenaphthalate, a glass fiber, TEFLON (tetrafluoroethylene), and polytetrafluoroethylene (PTFE). For example, the porous substrate 20 may be a polyolefin-based substrate, and the polyolefin-based substrate may improve safety of a battery due to a shut-down function. The polyolefin-based substrate may be, for example, selected from a polyethylene single film, a polypropylene single film, a polyethylene/polypropylene double film, a polypropylene/polyethylene/polypropylene triple film, and a polyethylene/polypropylene/polyethylene triple film. The polyolefin-based resin may include a non-olefin resin in addition to an olefin resin or a copolymer of olefin and a non-olefin monomer.

The porous substrate 20 may have a thickness of, for example, about 1 µm to about 40 µm, for example, about 1 µm to about 30 µm, about 1 µm to about 20 µm, about 5 µm to about 15 µm, or about 5 µm to about 10 µm.

The heat-resistance layer 30 may include a binder having, for example, a cross-linked structure, or may include, for example, a cross-linkable binder capable of forming the cross-linked structure. The cross-linkable binder may be derived from a polymer including a structural unit including an aromatic moiety and a (meth)acrylate group. The cross-linkable binder may include both the structural units including an aromatic moiety and the (meth)acrylate group, which may help improve heat resistance and increase stability of the separator at a high temperature.

The structural unit including the aromatic moiety may include, for example, a structural unit including aromatic imide or a derivative thereof, a structural unit including aromatic amide or a derivative thereof, a structural unit including novolac or a derivative thereof, a structural unit including bisphenol or a derivative thereof, or a combination thereof.

For example, the structural unit including the aromatic moiety may include, for example, a structural unit including aromatic imide or a derivative thereof represented by Chemical Formula 1 or 2.

[Chemical Formula 1]

[Chemical Formula 2]

According to the present example embodiment, in Chemical Formula 1 and 2, $L^1$ to $L^5$ are independently a single bond, a substituted or unsubstituted C1 to C30 divalent aliphatic group, a substituted or unsubstituted C3 to C30 divalent aliphatic cyclic group, a substituted or unsubstituted C6 to C30 divalent aromatic group, a substituted or unsubstituted C3 to C30 divalent heterocyclic group, a substituted or unsubstituted C3 to C30 divalent heteroaromatic group, O, CO, COO, $SO_2$ or $CONR^a$, or a combination thereof, $R^1$ to $R^4$, and $R^a$ are independently hydrogen, a substituted or unsubstituted C1 to C20 alkyl group, a substituted or unsubstituted C2 to C20 alkenyl group, a substituted or unsubstituted C1 to C20 alkoxy group, a substituted or unsubstituted C3 to C20 cycloalkyl group, a substituted or unsubstituted C3 to C20 cycloalkenyl group, a substituted or unsubstituted C6 to C20 aromatic group, a substituted or unsubstituted C3 to C20 heteroaromatic group, a substituted or unsubstituted silyl group, a hydroxy group, a halogen, a nitro group, or a combination thereof, and A is a substituted or unsubstituted C6 to C30 aromatic group or a C3 to C30 aliphatic cyclic group.

For example, $L^1$ to $L^5$ of Chemical Formula 1 and 2 may independently be a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, CO, COO, $SO_2$, or $CONR^a$, or a combination thereof.

For example, at least one of $L^1$ to $L^3$ of Chemical Formula 1 or at least one of $L^4$ and $L^5$ of Chemical Formula 2 may include a substituted or unsubstituted divalent aromatic group or a substituted or unsubstituted C3 to C30 divalent heteroaromatic group.

The structural unit including aromatic imide or a derivative thereof may be obtained, for example, by reaction of an anhydride and a diamine compound or diisocyanate.

The anhydride may be, for example, represented by Chemical Formula 1a or 2a.

[Chemical Formula 1a]

[Chemical Formula 2a]

In Chemical Formulae 1a and 2a, $L^1$ and $R^1$ to $R^4$ are the same as described above.

The anhydride may include, for example, 2,3,3',4'-biphenyltetracarboxylic dianhydride, 2,3,3',4'-diphenylsulfone tetracarboxylic dianhydride, 3,4'-oxydiphthalic anhydride, 3,3',4,4'-biphenyl tetracarboxylic dianhydride (BPDA), bicyclo[2.2.2]oct-7-ene-2,3,5,6-tetracarboxylic dianhydride (BTDA), 3,3',4,4'-diphenylsulfone tetracarboxylic dianhydride (DSDA), 4,4'-(hexafluoroisopropylidene)diphthalic anhydride (6FDA), 4,4'-oxydiphthalic anhydride (ODPA), pyromellitic dianhydride (PMDA) and 4-(2,5-dioxotetrahydrofuran-3-yl)-1,2,3,4-tetrahydronaphthalene-1,2-dicarboxylic anhydride (DTDA), or a combination thereof, etc.

The diamine compound may include, for example, at least one compound of Group 1,

[Group 1]

[Group 2]

Examples of the diisocyanate may be methylene diphenyl diisocyanate (MDI), p-phenylene diisocyanate (PPDI), toluene diisocyanate, etc.

The anhydride and the diamine compound or the diisocyanate may be, for example, included in a mole ratio of about 1:9 to about 9:1, for example, about 3:7 to about 7:3, or about 5:5.

For example, the structural unit including the aromatic moiety may include, for example, a structural unit including aromatic imide or a derivative thereof represented by Chemical Formula 1 or 2 and a structural unit including aromatic amide or a derivative thereof represented by Chemical Formula 3A or 3B,

[Chemical Formula 3A]

[Chemical Formula 3B]

In Group 1, $R^{32}$ to $R^{48}$ are independently hydrogen, a substituted or unsubstituted C1 to C20 alkyl group, a substituted or unsubstituted C1 to C20 alkoxy group, a substituted or unsubstituted C1 to C20 fluoroalkyl group, a substituted or unsubstituted C3 to C20 cycloalkyl group, a substituted or unsubstituted C3 to C20 heterocyclic group, a substituted or unsubstituted C3 to C20 oxycycloalkyl group, a substituted or unsubstituted C6 to C20 aryl group, a substituted or unsubstituted C6 to C20 oxyaryl group, a substituted or unsubstituted silyl group, a hydroxy group, a halogen, a nitro group, or a combination thereof, $X^2$ to $X^{10}$ are independently a single bond, a substituted or unsubstituted C1 to C20 alkylene group, a substituted or unsubstituted C1 to C20 cycloalkylene group, a substituted or unsubstituted C6 to C20 arylene group, a substituted or unsubstituted C3 to C20 divalent heterocyclic group, $SO_2$, O, CO, COO, groups of Group 2, or a combination thereof, n35 to n37 and n40 to n49 are independently an integer ranging from 0 to 4, and n38 and n39 are independently an integer ranging from 0 to 3.

In Chemical Formula 3A and 3B,

$L^6$ and $L^7$ are independently a single bond, a substituted or unsubstituted C1 to C30 divalent aliphatic group, a substituted or unsubstituted C3 to C30 divalent aliphatic cyclic group, a substituted or unsubstituted C6 to C30 divalent aromatic group, a substituted or unsubstituted C3 to C30 divalent heterocyclic group, a substituted or unsubstituted C3 to C30 divalent heteroaromatic group, O, CO, COO, $SO_2$, or $CONR^b$, or a combination thereof, and $R^5$ to $R^7$, and $R^b$ are independently hydrogen, a substituted or unsubstituted C1 to C20 alkyl group, a substituted or unsubstituted C2 to C20 alkenyl group, a substituted or unsubstituted C1 to C20 alkoxy group, a substituted or unsubstituted C3 to C20 cycloalkyl group, a substituted or unsubstituted C3 to C20 cycloalkenyl group, a substituted or unsubstituted C6 to C20 aromatic group, a substituted or unsubstituted C3 to C20 heteroaromatic group, a substituted or unsubstituted silyl group, a hydroxy group, a halogen, a nitro group, or a combination thereof.

For example, at least one of $L^6$ and $L^7$ of Chemical Formula 3A or 3B may include a substituted or unsubstituted C6 to C30 divalent aromatic group or a substituted or unsubstituted C3 to C30 divalent heteroaromatic group.

For example, the structural unit including the aromatic moiety may include a novolac moiety. The structural unit including the novolac moiety may be, for example, a novolac epoxy moiety represented by Chemical Formula 4.

[Chemical Formula 4]

In Chemical Formula 4, $R^8$ to $R^{11}$ are independently hydrogen, a substituted or unsubstituted C1 to C20 alkyl group, a substituted or unsubstituted C2 to C20 alkenyl group, a substituted or unsubstituted C1 to C20 alkoxy group, a substituted or unsubstituted C3 to C20 cycloalkyl group, a substituted or unsubstituted C3 to C20 cycloalkenyl group, a substituted or unsubstituted C6 to C20 aromatic group, a substituted or unsubstituted C3 to C20 heteroaromatic group, a substituted or unsubstituted silyl group, a hydroxy group, a halogen, a nitro group, or a combination thereof.

For example, the structural unit including the aromatic moiety may include a bisphenol derivative moiety represented by Chemical Formula 5.

[Chemical Formula 5]

In Chemical Formula 5,

A is a single bond, a substituted or unsubstituted C1 to C20 alkylene group, a substituted or unsubstituted C2 to C20 alkenylene group, a substituted or unsubstituted C3 to C20 cycloalkylene group, a substituted or unsubstituted C3 to C20 cycloalkenylene group, a substituted or unsubstituted C6 to C20 divalent aromatic group, a substituted or unsubstituted C3 to C20 divalent heteroaromatic group, —$SO_2$—, or a combination thereof, $R^{12}$ and $R^{13}$ are independently hydrogen, a substituted or unsubstituted C1 to C20 alkyl group, a substituted or unsubstituted C2 to C20 alkenyl group, a substituted or unsubstituted C1 to C20 alkoxy group, a substituted or unsubstituted C3 to C20 cycloalkyl group, a substituted or unsubstituted C3 to C20 cycloalkenyl group, a substituted or unsubstituted C6 to C20 aromatic group, a substituted or unsubstituted C3 to C20 heteroaromatic group, a substituted or unsubstituted silyl group, a hydroxy group, a halogen, a nitro group, or a combination thereof.

The bisphenol derivative moiety may be, for example, a moiety of bisphenol A or a derivative thereof, bisphenol B or a derivative thereof, bisphenol F or a derivative thereof, bisphenol S or a derivative thereof or combination thereof.

The (meth)acrylate group may be positioned at the terminal end of the polymer, and for example, the polymer may include at least two (meth)acrylate groups.

The (meth)acrylate group may be, for example, derived from acrylic acid, methacrylic acid, hydroxyalkyl acrylate, hydroxyalkyl methacrylate, carboxylalkylacrylate, carboxylalkylmethacrylate, acryloyloxyalkylsuccinic acid, methacryloyloxyalkylsuccinic acid, acryloyloxyalkylphthalic acid, methacryloyloxyalkylphthalic acid, ethylene glycol di(meth)acrylate, propylene glycol di(meth)acrylate, polyethylene glycol di(meth)acrylate, polypropylene glycol di(meth)acrylate, butanediol di(meth)acrylate, hexamethylene glycol di(meth)acrylate, trimethylolpropane tri(meth)acrylate, glycerine tri(meth)acrylate, pentaerythritol tri(meth)acrylate, pentaerythritol tetra(meth)acrylate, diglycerine hexa(meth)acrylate, or a combination thereof, etc.

A weight average molecular weight of the polymer may be, for example, about 1,000 g/mol to about 200,000 g/mol. For example, it may be about 1,000 g/mol to about 100,000 g/mol or about 1,000 g/mol to about 60,000 g/mol.

The binder may include one or more kinds of the polymer.

The binder may further include other compounds in addition to the polymer. When the polymer is a first binder, while the other compounds added to the polymer are a second binder, the second binder may be, for example, a cross-linkable compound other than the aforementioned compound and/or a non-cross-linkable compound.

The second binder may further include, for example, polyvinylidene fluoride (PVdF), a polyvinylidene fluoride-hexafluoropropylene (PVdF-HFP) copolymer, polymethylmethacrylate, polyacrylonitrile, polyvinylpyrrolidone, polyvinylacetate, a polyethylene-vinylacetate copolymer, polyethyleneoxide, cellulose acetate, cellulose acetate butyrate, cellulose acetate propionate, cyanoethylpullulan, cyanoethylpolyvinyl alcohol, cyanoethyl cellulose, cyanoethylsucrose, pullulan, carboxylmethyl cellulose, an acrylonitrile-styrene-butadiene copolymer, or a combination thereof, etc.

When the first binder and the second binder are included together, the first binder and the second binder may be included in a weight ratio of about 1:9 to about 9:1, for example, about 8:2 to about 2:8, about 7:3 to about 3:7, or about 6:4 to about 4:6.

The binder may be included in an amount of about 1 wt % to about 80 wt %, for example, about 3 wt % to about 70 wt % or about 5 wt % to about 50 wt % based on the total amount of the heat-resistance layer 30.

The heat-resistance layer 30 may further include a filler.

The filler may be an inorganic filler, an organic filler, an organic/inorganic filler, or a combination thereof.

The inorganic filler may be a ceramic material capable of improving heat resistance, for example, a metal oxide, a semi-metal oxide, a metal fluoride, a metal hydroxide, or a combination thereof. The inorganic filler may be, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, or a combination thereof, etc.

The organic filler may include an acrylic compound, an imide compound, an amide compound, or a combination thereof, etc. The organic filler may have a core-shell structure, etc.

The filler may have a particle shape or sheet shape having a size of, for example, about 1 nm to about 2000 nm, for example, about 100 nm to about 1000 nm, or about 100 nm to about 500 nm. Herein, the size is an average particle diameter or a longest diameter. When the filler has a size within the range, heat-resistance layer 30 may have a desirable strength.

The filler may be used by mixing two or more different kinds of fillers or two or more fillers having different sizes.

The filler may be included in an amount of about 30 wt % to about 95 wt %, for example, in an amount of about 60 wt % to about 90 wt % based on the total amount of the heat-resistance layer 30.

The filler may further improve heat resistance and thus prevent a separator from being sharply contracted or transformed as a temperature is increased.

The heat-resistance layer 30 may be about 0.01 μm to about 20 μm thick, for example, about 1 μm to about 10 μm, or about 1 μm to about 5 μm.

The separator for a rechargeable battery may be for example, formed by coating a heat-resistance composition on one surface or both surfaces of the porous substrate 20 and then drying and curing it. The heat-resistance composition may include the binder, the filler, an initiator, and a solvent.

The initiator may be a photoinitiator, a thermal initiator, or a combination thereof. The photoinitiator may be used for photo-polymerization using ultraviolet rays. Examples of the photoinitiator may be acetophenones such as diethoxyacetophenone, 2-hydroxy-2-methyl-1-phenylpropan-1-one, benzyldimethylketal, 1-hydroxycyclohexyl-phenylketone, and 2-methyl-2-morphine(4-thiomethylphenyl)propan-1-one; benzoinethers such as benzoinmethylether, benzoinethylether, benzoinisopropylether, and benzoinisobutylether; benzophenones such as benzophenone, o-benzoyl methyl benzoate, 4-phenylbenzophenone, 4-benzoyl-4'-methyldiphenylsulfurous acid, 4-benzoyl-N,N-dimethyl-N-[2-(1-oxo-2-propenyloxy)ethyl] benzenemetanamium bromide, and (4-benzoylbenzyl)trimethylammoniumchloride; thioxanthones such as 2,4-diethylthioxanthone, and 1-chloro-4-dichlorothioxanthone; 2,4,6-trimethylbenzoyldiphenylbenzoyloxide; sulfonium salts, etc. These may be used singularly or as a mixture of two or more. The thermal initiator may be used for a thermal polymerization. The thermal initiator may include organic peroxide free radical initiator such as diacylperoxides, peroxyketals, ketone peroxides, hydroperoxides, dialkylperoxides, peroxyesters, peroxydicarbonates, and for example, lauroyl peroxide, benzoyl peroxide, cyclohexanone peroxide, 1,1-bis(t-butylperoxy)-3,3,5-trimethylcyclohexane, and t-butylhydroperoxide. These may be used singularly or as a mixture of two or more.

The solvent may be any solvent that dissolve or disperse the binder, the filler, and the initiator without particular limit, for example, an alcohol such as methanol, ethanol, or isopropylalcohol, dimethyl formamide, dimethyl acetamide, tetramethylurea, triethylphosphate, N-methyl-2-pyrrolidone, dimethylsulfoxide, acetone, methylethylketone, methyli so butylketone, cyclohexanone, or a combination thereof, etc.

The coating may be, for example, spin coating, dip coating, bar coating, die coating, slit coating, roll coating, inkjet printing, etc.

The drying may be, for example, performed through drying with warm air, hot air, or low humid air, vacuum-drying, or radiation of a far-infrared ray, an electron beam, and the like, but the present disclosure is not limited thereto. The drying may be, for example, performed at about 60° C. to about 120° C., for example, about 80° C. to about 100° C. for about 5 seconds to about 60 seconds, in a batch or continuous method.

The curing may be performed through photocuring, thermal curing, or a combination thereof. The photocuring may be for example, performed by radiating UV of about 150 nm to about 170 nm for about 5 seconds to about 60 seconds. The thermal curing may be for example, performed at about 60° C. to about 120° C. for about 1 hour to about 36 hours, for example, about 80° C. to about 100° C. for about 10 hours to about 24 hours.

The separator for a rechargeable battery may be made using a method of lamination, coextrusion, and the like in addition to the method.

Hereinafter, a rechargeable lithium battery including the separator for a rechargeable battery is described.

A rechargeable lithium battery may be classified into a lithium ion battery, a lithium ion polymer battery, a lithium polymer battery, etc., depending on kinds of a separator and an electrolyte. It also may be classified to be cylindrical, prismatic, coin-type, pouch-type, etc., depending on shape. In addition, it may be bulk type and thin film type depending on sizes.

Herein, a prismatic rechargeable lithium battery as an example of a rechargeable lithium battery is explained.

Figure 2:
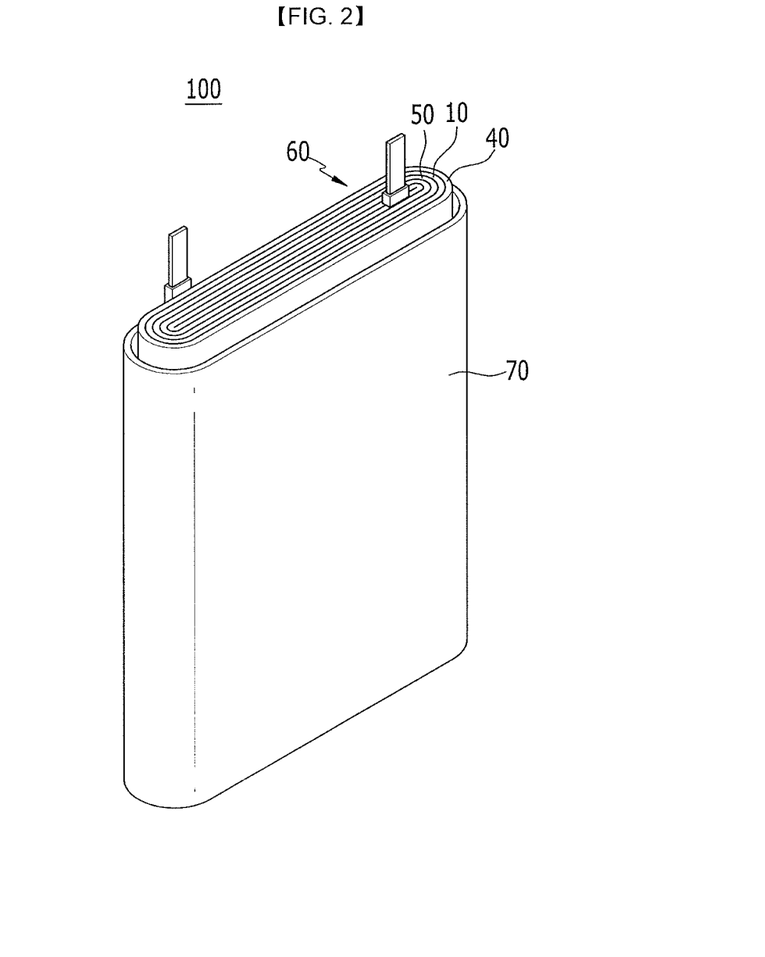
FIG. 2 illustrates an exploded perspective view showing a rechargeable lithium battery according to an embodiment.

FIG. 2 is an exploded perspective view of a rechargeable lithium battery according to an embodiment.

Referring to FIG. 2, a rechargeable lithium battery 100 according to an embodiment includes a wound electrode assembly 60 including a separator 10 interposed between a positive electrode 40 and a negative electrode 50, and a case 70 housing the electrode assembly 60.

The electrode assembly 60 is formed by interposing a separator 10 between the positive electrode 40 and the negative electrode 50 and then winding them into a jelly-roll shape.

The positive electrode 40, the negative electrode 50, and the separator 10 are impregnated in an electrolyte solution (not shown).

The positive electrode 40 includes a positive current collector and a positive active material layer formed on the positive current collector. The positive active material layer includes a positive active material, a binder, and optionally a conductive material.

The positive current collector may use aluminum (Al), nickel (Ni), etc.

The positive active material may use a compound being capable of intercalating and deintercalating lithium. For example, at least one of a composite oxide or a composite phosphate of a metal selected from cobalt, manganese, nickel, aluminum, iron, or a combination thereof and lithium may be used. For example, the positive active material may use lithium cobalt oxide, lithium nickel oxide, lithium manganese oxide, lithium nickel cobalt manganese oxide, lithium nickel cobalt aluminum oxide, lithium iron phosphate, or a combination thereof.

The binder improves binding properties of positive active material particles with one another and with a current collector. Examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, etc. These may be used singularly or as a mixture of two or more.

The conductive material improves conductivity of an electrode. Examples thereof may be natural graphite, artificial graphite, carbon black, a carbon fiber, a metal powder, a metal fiber, etc. These may be used singularly or as a mixture of two or more. The metal powder and the metal fiber may use a metal of copper, nickel, aluminum, silver, etc.

The negative electrode 50 includes a negative current collector and a negative active material layer formed on the negative current collector.

The negative current collector may use copper (Cu), gold (Au), nickel (Ni), a copper alloy, etc.

The negative active material layer may include, for example, a negative active material, and a binder. The negative active material layer may include, for example, a negative active material, a binder, and a conductive material.

The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material that is a suitable carbon-based negative active material, and examples thereof may be crystalline carbon, amorphous carbon, or a combination thereof. Examples of the crystalline carbon may be graphite such as amorphous, sheet-shape, flake, spherical shape or fiber-shaped natural graphite or artificial graphite. Examples of the amorphous carbon may be soft carbon (low temperature fired carbon) or hard carbon, a mesophase pitch carbonized product, fired coke, etc. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ (0<x<2), a Si—C composite, a Si—Y alloy, Sn, $SnO_2$, a Sn—C composite, a Sn—Y, and the like, and at least one of these may be mixed with $SiO_2$. Specific examples of the element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be vanadium oxide, lithium vanadium oxide, etc.

The binder and the conductive material used in the negative electrode may be the same as the binder and conductive material of the positive electrode.

The positive electrode 40 and the negative electrode 50 may be manufactured by mixing each active material composition including each active material and a binder, and optionally a conductive material in a solvent, and coating the active material composition on each current collector. Herein, the solvent may be N-methylpyrrolidone, etc.

The separator 10 is the same as described above.

The electrolyte solution includes an organic solvent and a lithium salt.

The organic solvent serves as a medium for transmitting ions taking part in the electrochemical reaction of a battery. Examples thereof may include a carbonate-based solvent, an ester-based solvent, an ether-based solvent, a ketone-based solvent, an alcohol-based solvent, and an aprotic solvent.

The carbonate based solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, etc. The ether-based solvent may be dibutyl ether, tetraglyme, diglyme, dimethoxyethane, 2-methyltetrahydrofuran, tetrahydrofuran, and the like, and the ketone-based solvent may be cyclohexanone, etc. The alcohol-based solvent may be ethanol, isopropyl alcohol, and the like, and the aprotic solvent may be nitriles such as R—CN (R is a C2 to C20 linear or branched or cyclic hydrocarbon group, a double bond, an aromatic ring, or an ether bond), and the like, amides such as dimethyl formamide, dioxolanes such as 1,3-dioxolane, sulfolanes, etc.

The organic solvent may be used alone or in a mixture. When the organic solvent is used in a mixture, the mixture ratio can be controlled in accordance with a desirable battery performance.

The lithium salt dissolved in an organic solvent supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1} SO_2)(C_yF_{2y+1} SO_2)$ wherein x and y are natural numbers), LiCl, LiI, $LiB(C_2O_4)_2$, or a combination thereof, etc.

The lithium salt may be used in a concentration ranging from about, for example, 0.1 M to about 2.0 M. When the lithium salt is included at the above concentration range, an electrolyte may have excellent performance and lithium ion mobility due to good electrolyte conductivity and viscosity.

The rechargeable lithium battery including the separator may be operated at a high voltage of greater than or equal to about 4.2 V, thus a rechargeable lithium battery having a high capacity may be accomplished without the deterioration of cycle life characteristics.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

SYNTHESIS EXAMPLE

Synthesis Example 1

205.5 g of 4,4'-(hexafluoroisopropylidene)diphthalic anhydride (TOKYO CHEMICAL INDUSTRY), 6.23 g of fumaric acid (Daejung Chemicals & Metals Co.), and 720.5 g of N,N-dimethyl acetamide (Samchun Chemical Co., Ltd.) were put in a mechanical agitator under a nitrogen flow and stirred until dissolved to prepare a binder solution. The binder solution was mixed with 97.1 g of toluene diisocyanate (Junsei Chemical Co., Ltd), the mixture was heated and stirred at 100° C. for one hour, 308.8 g of pentaerythritol triacrylate (M340, Miwon Specialty Chemical Co., Ltd.) was added thereto, the obtained mixture was additionally stirred at 70° C. for 1 hour to synthesize a polymer represented by Chemical Formula 4.

A weight average molecular weight (Mw) of the polymer was about 35,000.

Synthesis Example 2

49.9 g of bicyclo[2.2.2]oct-7-ene-2,3,5,6-tetracarboxylic dianhydride (TOKYO CHEMICAL INDUSTRY) and 501.4 g of N,N-dimethyl acetamide were put in a mechanical agitator under a nitrogen flow until dissolved to prepare a binder solution. The binder solution was mixed with 70.0 g of toluene diisocyanate, the mixture was heated and stirred at 100° C. for 30 minutes, 47.3 g of pentaerythritol triacrylate was added thereto, the obtained mixture was additionally stirred at 45° C. for 1 hour to synthesize a polymer represented by Chemical Formula 5.

A weight average molecular weight (Mw) of the polymer was about 52,000.

Synthesis Example 3

28.5 g of bicyclo[2.2.2]oct-7-ene-2,3,5,6-tetracarboxylic dianhydride (TOKYO CHEMICAL INDUSTRY) and 232.0 g of N,N-dimethyl acetamide were put in a mechanical agitator under a nitrogen flow until dissolved to prepare a binder solution. The binder solution was mixed with 40.0 g of toluene diisocyanate, the mixture was heated and stirred at 100° C. for 30 minutes, 10.0 g of methanol was added thereto, and the obtained mixture was additionally stirred at 45° C. for 1 hour to synthesizing a polymer represented by Chemical Formula 6.

A weight average molecular weight (Mw) of the polymer was about 45,000.

[Chemical Formula 4]

[Chemical Formula 6]

[Chemical Formula 5]

PREPARATION EXAMPLE

Preparation Example 1

A composition was prepared by mixing 2.2 wt % of the polymer solution (a first binder solution) according to Synthesis Example 1; 9.5 wt % of a second binder solution prepared by mixing 7 wt % of polyvinylidene fluoride hexafluoropropylene (PVdF-HFP) (KF9300, Kureha), 25 wt % of dimethyl acetamide, and 68 wt % of acetone at 40° C. for 4 hours; 53.3 wt % of an inorganic dispersion prepared by mixing 25 wt % of $Al_2O_3$ and 75 wt % of acetone through a bead mill at 25° C. for 2 hours; 34.8 wt % of acetone; and 0.2 wt % of BPO (benzoylperoxide).

The composition was dip coated to be respectively 2 μm-thick on both sides of a 12 μm-thick polyethylene substrate (SK Innovation Co.) and then dried and cured at 80° C. at a speed of 10 m/s.

Preparation Example 2

A composition was prepared by mixing 4.0 wt % of the polymer solution according to Synthesis Example 2 (a first binder solution); 9.5 wt % of a second binder solution prepared by mixing 7 wt % of polyvinylidene fluoride hexafluoropropylene (PVdF-HFP) (KF9300, Kureha), 25 wt % of dimethyl acetamide, and 68 wt % of acetone at 40° C. for 4 hours; 53.3 wt % of an inorganic dispersion prepared by mixing 25 wt % of $Al_2O_3$ and 75 wt % of acetone through a bead mill at 25° C. for 2 hours; 33.0 wt % of acetone; and 0.2 wt % of BPO (benzoylperoxide).

The composition was dip coated to be respectively 2 μm thickness on both sides of a 12 μm-thick polyethylene substrate (SK innovation Co.) and then dried and cured at 80° C. at a speed of 10 m/s.

Preparation Example 3

A composition was prepared by mixing 3.3 wt % of a first binder solution prepared by mixing 9 wt % of a novolac epoxy acrylate polymer (SE1636, Soltech, Ltd), 21 wt % of ethoxylated pentaerythritol tetraacrylate (PE044, Hannon Chemicals Inc.), and 70 wt % of acetone; 9.5 wt % of a second binder solution prepared by mixing 7 wt % of polyvinylidene fluoride hexafluoropropylene (PVdF-HFP) (KF9300, Kureha), 25 wt % of dimethyl acetamide, and 68 wt % of acetone at 40° C. for 4 hours; 53.3 wt % of an inorganic dispersion prepared by mixing 25 wt % of $Al_2O_3$ and 75 wt % of acetone through a bead mill at 25° C. for 2 hours; 34.8 wt % of acetone; and 0.2 wt % of BPO (benzoylperoxide).

The composition was dip coated to be respectively 2 μm thick on both sides of a 12 μm-thick polyethylene substrate (SK Innovation Co.) and then dried and cured at 80° C. at a speed of 10 m/s.

Preparation Example 4

A separator was manufactured according to the same method as Preparation Example 3 except for using 9 wt % of a novolac epoxy acrylate polymer (Sartomer) as a first binder solution, 21 wt % of ethoxylated pentaerythritol tetraacrylate (PE044, Hannon Chemicals Inc.), and 70 wt % of acetone.

Preparation Example 5

A separator was manufactured according to the same method as Preparation Example 3 except for using 12 wt % of a novolac epoxy acrylate polymer (SC6400, Miwon Specialty Chemical Co., LTD) as a first binder solution, 18 wt % of ethoxylated pentaerythritol tetraacrylate (PE044, Hannon Chemicals Inc.), and 70 wt % of acetone.

Preparation Example 6

A separator was manufactured according to the same method as Preparation Example 3 except for using 4.5 wt % of a bisphenol A ethoxy acrylate polymer (PE210, Miwon Specialty Chemical Co., LTD) as a first binder solution, 25.5 wt % of ethoxylated pentaerythritol tetraacrylate (PE044, Hannon Chemicals Inc.), and 70 wt % of acetone.

Comparative Preparation Example 1

A separator was manufactured according to the same method as Preparation Example 3 except for mixing 30 wt % of ethoxylated pentaerythritol tetraacrylate (PE044, Hannon Chemicals Inc.) and 70 wt % of acetone as the first binder solution.

Comparative Preparation Example 2

A separator was manufactured according to the same method as Preparation Example 3 except for mixing 30 wt % of urethane acrylate (MU9800, Miwon Specialty Chemical Co., Ltd.) and 70 wt % of acetone as the first binder solution.

Comparative Preparation Example 3

A composition was prepared by mixing 4.0 wt % of the polymer solution according to Synthesis Example 3 (a first binder solution); 9.5 wt % of a second binder solution prepared by mixing 7 wt % of polyvinylidene fluoride hexafluoropropylene (PVdF-HFP) (KF9300, Kureha), 25 wt % of dimethyl acetamide, and 68 wt % of acetone at 40° C. for 4 hours; 53.3 wt % of an inorganic dispersion prepared by mixing 25 wt % of $Al_2O_3$ and 75 wt % of acetone through a bead mill at 25° C. for 2 hours; and 33.2 wt % of acetone.

The composition was dip coated to be respectively 2 μm thick on both sides of a 12 μm-thick polyethylene substrate (SK Innovation Co.) and then dried and cured at 80° C. at a speed of 10 m/s.

Comparative Preparation Example 4

The composition was prepared by mixing 2.7 wt % of the polymer solution according to Synthesis Example 3 (a first binder solution); 9.5 wt % of a second binder solution prepared by mixing 7 wt % of polyvinylidene fluoride hexafluoropropylene (PVdF-HFP) (KF9300, Kureha), 25 wt % of dimethyl acetamide, and 68 wt % of acetone at 40° C. for 4 hours; 1.1 wt % of a third binder solution including 30 wt % of ethoxylated pentaerythritol tetraacrylate (PE044, Hannon Chemicals Inc.) and 70 wt % of acetone; 53.3 wt % of an inorganic dispersion prepared by mixing 25 wt % of $Al_2O_3$ and 75 wt % of acetone through a bead mill at 25° C. for 2 hours; 33.2 wt % of acetone; and 0.2 wt % of BPO (benzoylperoxide).

The composition was dip coated to be respectively 2 μm thick on both sides of a 12 μm-thick polyethylene substrate (SK innovation Co.) and then dried and cured at 80° C. at a speed of 10 m/s.

Evaluation

The separators according to Preparation Examples 1 to 6 and Comparative Preparation Examples 1 to 4 were respectively cut into a size of 5 cm×5 cm to prepare each separator sample. MD direction length, TD direction length, thickness of each separator sample were measured. After setting a convection oven at 200° C. and waiting until the temperature became stable, each separator was inserted between two sheets of A4-sized paper and then put with the papers in the convection oven maintained at 200° C. After 10 minutes, each separator sample was taken out of the oven, and its MD direction length, TD direction length, and thickness were measured again.

The thermal shrinkage ratios and thickness variation ratios of the separators in the MD direction and the TD direction were calculated by Calculation Equations 1 to 3.

Thermal shrinkage ratio (%) in an MD direction=$(L(MD)_0-L(MD)_1)/L(MD)_0 \times 100$ [Calculation Equation 1]

Thermal shrinkage ratio (%) in a TD direction=$(L(TD)_0-L(TD)_1)/L(TD)_0 \times 100$ [Calculation Equation 2]

Thickness variation ratio (%)= $[(T_0-T_1)]/T_0 \times 100$ [Calculation Equation 3]

In Calculation Equations 1 to 3, $L(MD)_0$ is an initial length of a separator in a MD direction, $L(MD)_1$ is a length of a separator in an MD direction after allowed to stand at 200° C. for 10 minutes, $L(TD)_0$ is an initial length of a separator in a TD direction, $L(TD)_1$ is a length of a separator in a TD direction after allowed to stand at 200° C. for 10 minutes, $T_0$ is an initial thickness of a separator, and $T_1$ is a thickness of a separator after allowed to stand at 200° C. for 10 minutes.

The results are provided in Table 1.

TABLE 1

|  | Thermal shrinkage ratio (200° C., 10 min) | | Thickness variation ratio | Deteriorated or not (shattered) |
| --- | --- | --- | --- | --- |
|  | MD (%) | TD (%) |  |  |
| Preparation Example 1 | 3 | 4 | 23% | X |
| Preparation Example 2 | 2 | 2 | 23% | X |
| Preparation Example 3 | 3 | 3 | 21% | X |
| Preparation Example 4 | 2 | 3 | 22% | X |
| Preparation Example 5 | 2 | 2 | 23% | X |
| Preparation Example 6 | 2 | 4 | 24% | X |
| Comparative Preparation Example 1 | 3 | 3 | 37% | ○ |
| Comparative Preparation Example 2 | 3 | 4 | 39% | ○ |
| Comparative Preparation Example 3 | 48 | 50 | 268% | X |
| Comparative Preparation Example 4 | 45 | 46 | 281% | X |

* Deteriorated (shattered) or not: examined with naked eyes

Referring to Table 1, the separators according to Preparation Examples 1 to 6 were not shattered, and exhibited a low thermal shrinkage ratio and thickness variation ratio after being allowed to stand at a high temperature. Specifically, the separators according to Preparation Examples 1 to 6 showed less than or equal to 10% of each thermal shrinkage ratio in the MD direction and the TD direction and less than or equal to 30% of a thickness variation ratio after allowed to stand at 200° C. for 10 minutes. On the contrary, the separators according to Comparative Preparation Examples 1 to 4 showed a large thickness variation ratio, and the separators according to Comparative Preparation Examples 1 and 2 showed a shattered appearance after being allowed to stand at a high temperature.

By way of summation and review, when shrinkage and expansion of a positive electrode and a negative electrode during charge and discharge cycles of a battery are repeated or a battery is abnormally operated, exothermic heat may increase, and thus a battery temperature may be abruptly increased. In this case, a separator may be abruptly contracted or destroyed and thereby, short circuit between a positive electrode and a negative electrode may occur.

As described above, embodiments may provide a separator for a rechargeable battery capable of improving high temperature stability. According to embodiments, the separator may be prevented from a shrinkage and deformation at a high temperature, and thus stability of the battery including the separator may be increased.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A separator for a rechargeable battery, comprising:
   a porous substrate, and
   a heat-resistance layer disposed on at least one surface of the porous substrate,
   wherein the heat-resistance layer includes a cross-linkable binder, and the cross-linkable binder is derived from a polymer including a structural unit including an aromatic moiety and a (meth)acrylate group,
   wherein the (meth)acrylate group is positioned only at the terminal end of the polymer.

2. The separator as claimed in claim 1, wherein the structural unit including the aromatic moiety includes a structural unit including aromatic imide or a derivative thereof, a structural unit including aromatic amide or a derivative thereof, a structural unit including novolac or a derivative thereof, a structural unit including bisphenol or a derivative thereof, or a combination thereof.

3. The separator as claimed in claim 2, wherein the structural unit including the aromatic moiety is represented by Chemical Formula 1 or 2:

[Chemical Formula 1]

-continued

[Chemical Formula 2]

wherein, in Chemical Formula 1 and 2, $L^1$ to $L^5$ are independently a single bond, a substituted or unsubstituted C1 to C30 divalent aliphatic group, a substituted or unsubstituted C3 to C30 divalent aliphatic cyclic group, a substituted or unsubstituted C6 to C30 divalent aromatic group, a substituted or unsubstituted C3 to C30 divalent heterocyclic group, a substituted or unsubstituted C3 to C30 divalent heteroaromatic group, O, CO, COO, $SO_2$, or $CONR^a$, or a combination thereof,

$R^1$ to $R^4$, and $R^a$ are independently hydrogen, a substituted or unsubstituted C1 to C20 alkyl group, a substituted or unsubstituted C2 to C20 alkenyl group, a substituted or unsubstituted C1 to C20 alkoxy group, a substituted or unsubstituted C3 to C20 cycloalkyl group, a substituted or unsubstituted C3 to C20 cycloalkenyl group, a substituted or unsubstituted C6 to C20 aromatic group, a substituted or unsubstituted C3 to C20 heteroaromatic group, a substituted or unsubstituted silyl group, a hydroxy group, a halogen, a nitro group, or a combination thereof, and A is a substituted or unsubstituted C6 to C30 aromatic group or a C3 to C30 aliphatic cyclic group.

4. The separator as claimed in claim 3, wherein at least one of $L^1$ to $L^3$ of Chemical Formula 1 or at least one of $L^4$ and $L^5$ of Chemical Formula 2 includes a substituted or unsubstituted divalent aromatic group or a substituted or unsubstituted C3 to C30 divalent heteroaromatic group.

5. The separator as claimed in claim 3, wherein the structural unit including the aromatic moiety includes:
a moiety represented by Chemical Formula 1 or 2, and
a moiety represented by Chemical Formula 3A or 3B,

[Chemical Formula 1]

[Chemical Formula 2]

wherein, in Chemical Formula 1 and 2, $L^1$ to $L^5$ are independently a single bond, a substituted or unsubstituted C1 to C30 divalent aliphatic group, a substituted or unsubstituted C3 to C30 divalent aliphatic cyclic group, a substituted or unsubstituted C6 to C30 divalent aromatic group, a substituted or unsubstituted C3 to C30 divalent heterocyclic group, a substituted or unsubstituted C3 to C30 divalent heteroaromatic group, O, CO, COO, $SO_2$, or $CONR^a$, or a combination thereof,

$R^1$ to $R^4$ and $R^a$ are independently hydrogen, a substituted or unsubstituted C1 to C20 alkyl group, a substituted or unsubstituted C2 to C20 alkenyl group, a substituted or unsubstituted C1 to C20 alkoxy group, a substituted or unsubstituted C3 to C20 cycloalkyl group, a substituted or unsubstituted C3 to C20 cycloalkenyl group, a substituted or unsubstituted C6 to C20 aromatic group, a substituted or unsubstituted C3 to C20 heteroaromatic group, a substituted or unsubstituted silyl group, a hydroxy group, a halogen, a nitro group, or a combination thereof, and A is a substituted or unsubstituted C6 to C30 aromatic group or a C3 to C30 aliphatic cyclic group,

[Chemical Formula 3A]

[Chemical Formula 3B]

wherein, in Chemical Formula 3A and 3B, $L^6$ and $L^7$ are independently a single bond, a substituted or unsubstituted C1 to C30 divalent aliphatic group, a substituted or unsubstituted C3 to C30 divalent aliphatic cyclic group, a substituted or unsubstituted C6 to C30 divalent aromatic group, a substituted or unsubstituted C3 to C30 divalent heterocyclic group, a substituted or unsubstituted C3 to C30 divalent heteroaromatic group, O, CO, COO, $SO_2$, or $CONR^b$, or a combination thereof, and $R^5$ to $R^7$ and $R^b$ are independently hydrogen, a substituted or unsubstituted C1 to C20 alkyl group, a substituted or unsubstituted C2 to C20 alkenyl group, a substituted or unsubstituted C1 to C20 alkoxy group, a substituted or unsubstituted C3 to C20 cycloalkyl group, a substituted or unsubstituted C3 to C20 cycloalkenyl group, a substituted or unsubstituted C6 to C20 aromatic group, a substituted or unsubstituted C3 to C20 heteroaromatic group, a substituted or unsubstituted silyl group, a hydroxy group, a halogen, a nitro group, or a combination thereof.

6. The separator as claimed in claim 5, wherein:
at least one of $L^1$ to $L^3$ of Chemical Formula 1 or at least one of $L^4$ and $L^5$ of Chemical Formula 2 includes a substituted or unsubstituted divalent aromatic group or a substituted or unsubstituted C3 to C30 divalent heteroaromatic group, and
at least one of $L^6$ and $L^7$ of Chemical Formula 3A or 3B includes a substituted or unsubstituted C6 to C30 divalent aromatic group or a substituted or unsubstituted C3 to C30 divalent heteroaromatic group.

7. The separator as claimed in claim 2, wherein the structural unit including the aromatic moiety includes a novolac epoxy moiety.

8. The separator as claimed in claim 2, wherein the structural unit including the aromatic moiety includes a moiety of bisphenol A or a derivative thereof, bisphenol B or a derivative thereof, bisphenol F or a derivative thereof, bisphenol S or a derivative thereof, or a combination thereof.

9. The separator as claimed in claim 1, wherein the polymer has at least two (meth)acrylate groups.

10. The separator as claimed in claim 1, wherein the heat-resistance layer further includes polyvinylidene fluoride (PVdF), polyvinylidene fluoride-hexafluoropropylene (PVdF-HFP) copolymer, polymethylmethacrylate, polyacrylonitrile, polyvinylpyrrolidone, polyvinylacetate, a polyethylene-vinylacetate copolymer, polyethyleneoxide, cellulose acetate, cellulose acetate butyrate, cellulose acetate propionate, cyanoethylpullulan, cyanoethylpolyvinyl alcohol, cyanoethyl cellulose, cyanoethylsucrose, pullulan, carboxylmethyl cellulose, an acrylonitrile-styrene-butadiene copolymer, or a combination thereof.

11. The separator as claimed in claim 1, wherein the heat-resistance layer further includes an inorganic filler, an organic filler, an organic/inorganic filler, or a combination thereof.

12. The separator as claimed in claim 11, wherein the inorganic filler includes a metal oxide, a semi-metal oxide, a metal fluoride, a metal hydroxide, or a combination thereof, and
the organic filler includes an acrylic compound, an imide compound, an amide compound, or a combination thereof.

13. The separator as claimed in claim 12, wherein the inorganic filler includes $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, or a combination thereof.

14. The separator as claimed in claim 1, wherein the porous substrate includes a polyolefin.

15. The separator as claimed in claim 1, wherein the porous substrate includes a single layer or two or more layers.

16. The separator as claimed in claim 1, wherein the separator exhibits a thickness variation ratio of less than or equal to about 30% after being allowed to stand at 200° C. for 10 minutes.

17. A rechargeable lithium battery, comprising:
a positive electrode,
a negative electrode, and
the separator as claimed in claim 1 between the positive electrode and the negative electrode.

* * * * *